J. HINDS.
Bean-Harvesters.
No. 137,370.  Patented April 1, 1873.
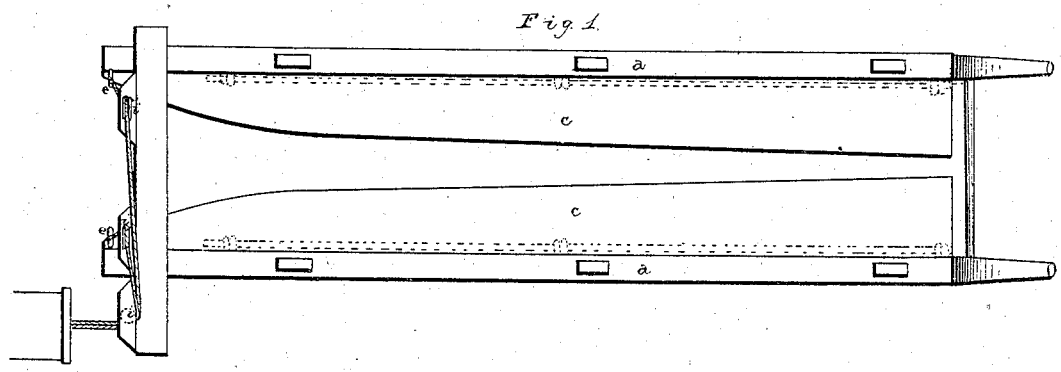
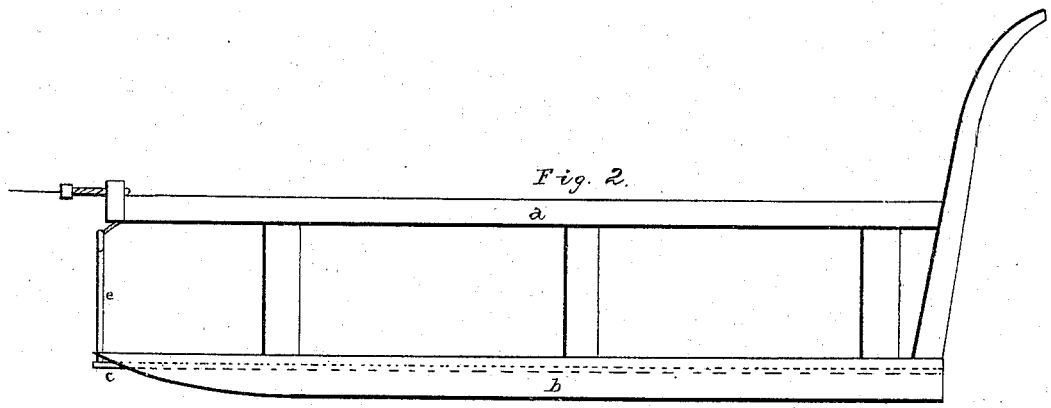
WITNESSES:
Alex Davidson
W. K. Duhamel
INVENTOR.
Jacob Hinds
Per H. S. Abbot
Attorney

UNITED STATES PATENT OFFICE.

JACOB HINDS, OF HINDSBURG, NEW YORK.

IMPROVEMENT IN BEAN-HARVESTERS.

Specification forming part of Letters Patent No. 137,370, dated April 1, 1873; application filed February 15, 1873.

*To all whom it may concern:*

Be it known that I, J. HINDS, of Hindsburg, county of Orleans and State of New York, have invented certain new and use Improvements in Bean-Harvesters, of which the following is a specification:

The nature of my invention relates to the construction of a machine for harvesting beans; and consists in two hinged iron blades, secured to any suitable frame, and which, as they are drawn forward, come on each side of the row, and gather the stalks and carry them along until it is desired to dump them.

Figure 1 represents a plan view of my invention. Fig. 2 shows a side view of the same.

$a$ represents any suitable kind of a frame, provided with handles at its rear end, and which may be drawn by any suitable motive power. Hinged to the inside of each of the runners $b$ is a metal plate or cutter, $c$, having their front ends rounding away from each other, but gradually drawing near together at their rear ends, as shown in Fig. 1. To each plate or cutter, at the extreme front, is secured an upright rod, $e$, to which are attached the draft-chains and which extend up over and around the three pulleys $i$, and then are fastened to the motive power. The cutters or plates are secured to the runners by any suitable hinged devices, which will allow them to be drawn up sufficiently far to extend horizontally towards each other, and when the frame is raised upward for dumping they at once fall by their own weight.

As soon as the frame starts forward the whole draft comes on the two rods $e$, which raise and keep the plates on a horizontal plane, so as to straddle a row of beans. As they are drawn forward the plates extend into the sides of the row, loosening and cutting the roots, and, as they catch toward the rear end, the plants are carried forward until the space between the two plates is full, when the team is stopped, which loosens the draft on the rods $e$, and the whole load is dumped by simply raising the rear end of the frame.

This device is very simple in construction and efficient in operation, accomplishing with one man and one horse what it would take many men to do in the same time.

Having thus described my invention, what I claim as new, and desire to secure by Letters Patent, is—

The hinged plates or cutters, secured to a suitable frame, and arranged to operate substantially as set forth.

In testimony that I claim the foregoing as my invention I hereunto affix my signature this 8th day of February, 1873.

JACOB HINDS.

Witnesses:
  M. A. HINDS,
  M. K. HINDS.